United States Patent
Shimma

(10) Patent No.: US 8,482,782 B2
(45) Date of Patent: *Jul. 9, 2013

(54) IMAGE OUTPUT SYSTEM AND CONTROL METHOD THEREOF, IMAGE INPUT APPARATUS AND CONTROL METHOD THEREOF, AND IMAGE OUTPUT APPARATUS AND CONTROL METHOD THEREOF

(75) Inventor: Naoki Shimma, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

This patent is subject to a terminal disclaimer.

(21) Appl. No.: 13/617,221

(22) Filed: Sep. 14, 2012

(65) Prior Publication Data

US 2013/0010124 A1    Jan. 10, 2013

Related U.S. Application Data

(63) Continuation of application No. 12/490,835, filed on Jun. 24, 2009, now Pat. No. 8,289,550.

(30) Foreign Application Priority Data

Jun. 30, 2008    (JP) ................................. 2008-171238

(51) Int. Cl.
*G06F 15/00*    (2006.01)
*G06F 3/12*    (2006.01)
*G06K 1/00*    (2006.01)

(52) U.S. Cl.
USPC .......................................... 358/1.15; 358/1.13

(58) Field of Classification Search
None
See application file for complete search history.

(56) References Cited

U.S. PATENT DOCUMENTS 7,024,232 B2 *   4/2006   Ponce De Leon et al. . 455/575.5
2009/0116054 A1 *   5/2009   Mitsudomi .................. 358/1.15

* cited by examiner

*Primary Examiner* — Douglas Tran
(74) *Attorney, Agent, or Firm* — Cowan, Liebowitz & Latman, P.C.

(57) ABSTRACT

An image output system connecting an image input apparatus and an image output apparatus by a close proximity wireless communication, and outputting by the image output apparatus of image data transmitted from the image input apparatus by the wireless communication. The image input apparatus detects a connection condition of the wireless communication, generates a script for defining an output processing according to at least a user operation, and transmits the script to the image output apparatus when the disconnection is detected after image data transmission, and the connection is detected again after disconnection detection. The image output apparatus detects the connection condition of the wireless communication, suspend output processing of the image data when the disconnection is detected during the image data output processing, and controls the image data output processing according to the script received from the image input apparatus when the connection is detected again.

19 Claims, 13 Drawing Sheets

FIG. 6

```
<startJob>
  <jobConfig>
    <quality>50000000</quality>
    <paperSize>51060000</paperSize>
    <paperType>52020000</paperType>
    <fileType>53000000</fileType>
    <datePrint>54010000</datePrint>
    <fileNamePrint>55000000</fileNamePrint>
    <imageOptimize>56000000</imageOptimize>
    <fixedSize>58030000</fixedSize>
    <cropping>59000000</cropping>
  </jobConfig>
  <printInfo>
    <fileID>00000001</fileID>
    <date>2002/10/28</date>
  </printInfo>
</startJob>
```

F I G. 7

```
<notifyDeviceStatus>
  <dpsPrintServiceStatus>70010000</dpsPrintServiceStatus>
  <jobEndReason>71000000</jobEndReason>
  <errorStatus>72010000</errorStatus>
  <errorReason>73010000</errorReason>
  <disconnectEnable>74010000</disconnectEnable>
  <capabilityChanged>75010000</capabilityChanged>
  <newJobOK>76000000</newJobOK>
</notifyDeviceStatus>
```

F I G. 8

```
<notifyJobStatus>
  <progress>004/006</progress>
  <imagesPrinted>003</imagesPrinted>
</notifyJobStatus>
```

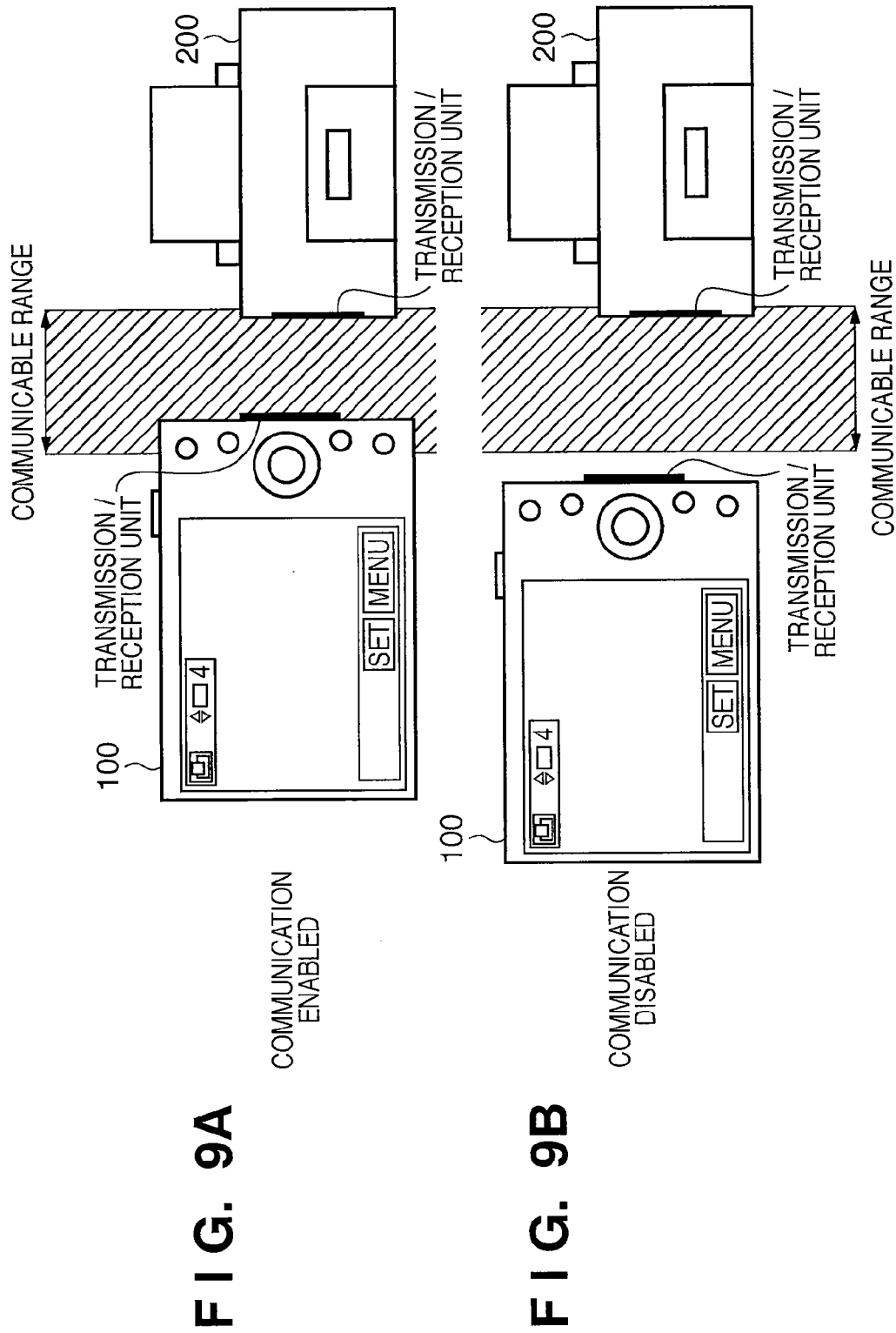

IMAGE OUTPUT SYSTEM AND CONTROL METHOD THEREOF, IMAGE INPUT APPARATUS AND CONTROL METHOD THEREOF, AND IMAGE OUTPUT APPARATUS AND CONTROL METHOD THEREOF

CROSS-REFERENCE TO RELATED APPLICATIONS

This application is a continuation of application Ser. No. 12/490,835, filed Jun. 24, 2009 the entire disclosure of which is hereby incorporated by reference.

BACKGROUND OF THE INVENTION

1. Field of the Invention

The present invention relates to a technique required upon making data communications between an image input apparatus and an image output apparatus.

2. Description of the Related Art

In recent years, techniques that exchange information by close proximity wireless communications having a communication distance of less than 1 m (such as RFID and NFC) have prevailed. Note that "RFID" is a short for Radio Frequency Identification. Also, "NFC" is a short for Near Field Communication.

On the other hand, in the close proximity wireless communication, a disconnection of a communication relatively readily occurs since it is a wireless communication, a communicable range is narrow, and it is difficult for the user to recognize a communication state. Therefore, in a communication between devices using the close proximity wireless communication, a measure against a communication disconnection has to be fully considered. Japanese Patent Laid-Open No. 2004-252952 has proposed the following method. In this method, when a communication disconnection between an image input apparatus and image output apparatus has occurred, output processing is suspended, and when a communication is established again, the output processing is resumed.

SUMMARY OF THE INVENTION

According to one aspect of embodiments of the present invention, the present invention relates to an image output system which connects an image input apparatus and an image output apparatus by a close proximity wireless communication, and outputs image data, which is transmitted from the image input apparatus by the close proximity wireless communication, by the image output apparatus, the image input apparatus comprising a first communication unit configured to perform the close proximity wireless communication, a first detection unit configured to detect whether state of the close proximity wireless communication is connected or disconnected, an operation unit configured to accept a user operation that designates output processing to be executed by the image output apparatus, a script generation unit configured to generate a script used to define the output processing in accordance with at least the user operation accepted by the operation unit, and a first control unit configured to control the first communication unit to transmit the script generated by the script generation unit to the image output apparatus when the first detection unit detects the disconnection after the first communication unit transmits image data, and the first detection unit detects the connection again after detection of the disconnection, and the image output apparatus comprising a second communication unit configured to perform the close proximity wireless communication, a second detection unit configured to detect whether the close proximity wireless communication is connected or disconnected, an image output unit configured to output image data, and a second control unit configured to suspend output processing of the image data by the image output unit when the second detection unit detects the disconnection during the output processing of the image data, which is received by the second communication unit, by the image output unit, and to control the output processing of the image data by the image output unit in accordance with the script received from the image input apparatus by the second communication unit when the second detection unit detects the connection again.

According to another aspect of embodiments of the present invention, the present invention relates to an image input apparatus for transmitting image data to an image output apparatus connected by a close proximity wireless communication, comprising a communication unit configured to perform the close proximity wireless communication; a detection unit configured to detect whether state of the close proximity wireless communication is connected or disconnected, an operation unit configured to accept a user operation that designates output processing to be executed by the image output apparatus, a script generation unit configured to generate a script used to define the output processing in accordance with at least the user operation accepted by the operation unit, and a control unit configured to control the communication unit to transmit the script generated by the script generation unit to the image output apparatus when the detection unit detects the disconnection after the first communication unit transmits image data, and the detection unit detects the connection again after detection of the disconnection.

According to further aspect of embodiments of the present invention, the present invention relates to an image output apparatus for outputting image data transmitted from an image input apparatus connected by a close proximity wireless communication, comprising a communication unit configured to perform the close proximity wireless communication, a detection unit configured to detect whether state of the close proximity wireless communication is connected or disconnected, an image output unit configured to output image data received from the image input apparatus by the communication unit, and a control unit configured to suspend output processing of the image data by the image output unit when the detection unit detects the disconnection during the output processing of the image data by the image output unit, and to control the output processing of the image data by the image output unit in accordance with a script which is received from the image input apparatus by the communication unit and is used to define output processing to be executed by the image output apparatus when the detection unit detects the connection again.

Further features of the present invention will become apparent from the following description of exemplary embodiments with reference to the attached drawings.

BRIEF DESCRIPTION OF THE DRAWINGS

FIG. 6 is a view showing the structure of an example of a DPS_StartJob script;

FIG. 7 is a view showing the structure of an example of a DPS_NotifyDeviceStatus script;

FIG. 8 is a view showing the structure of an example of a DPS_NotifyJobStatus script;

FIGS. 9A and 9B are views for explaining a communicable range by a close proximity wireless communication;

DESCRIPTION OF THE EMBODIMENTS

Embodiments of the present invention will be described hereinafter with reference to the drawings. The present invention relates to control of an image output apparatus (for example, a printer) when an image input apparatus (for example, a digital camera) and the image output apparatus are connected by a close proximity wireless communication.

In this specification, "close proximity wireless communication" means a wireless communication based on a communication protocol which is specified under the assumption that a communication distance is less than 1 m and, more particularly, it is less than several 10 cm. As such communication protocol, a "Vicinity" non-contact communication protocol having a communication distance of about 70 cm or less, and a "Proximity" non-contact communication protocol having a communication distance of about 10 cm or less are known. More specifically, the standards such as ISO/IEC 15693, ISO/IEC 14434, and ECMA-340 (ISO/IEC 18092) are available.

An image input apparatus and image output apparatus which are applicable to an image output system according to an embodiment of the present invention will be described below with reference to FIGS. 1 and 2.

Figure 1:
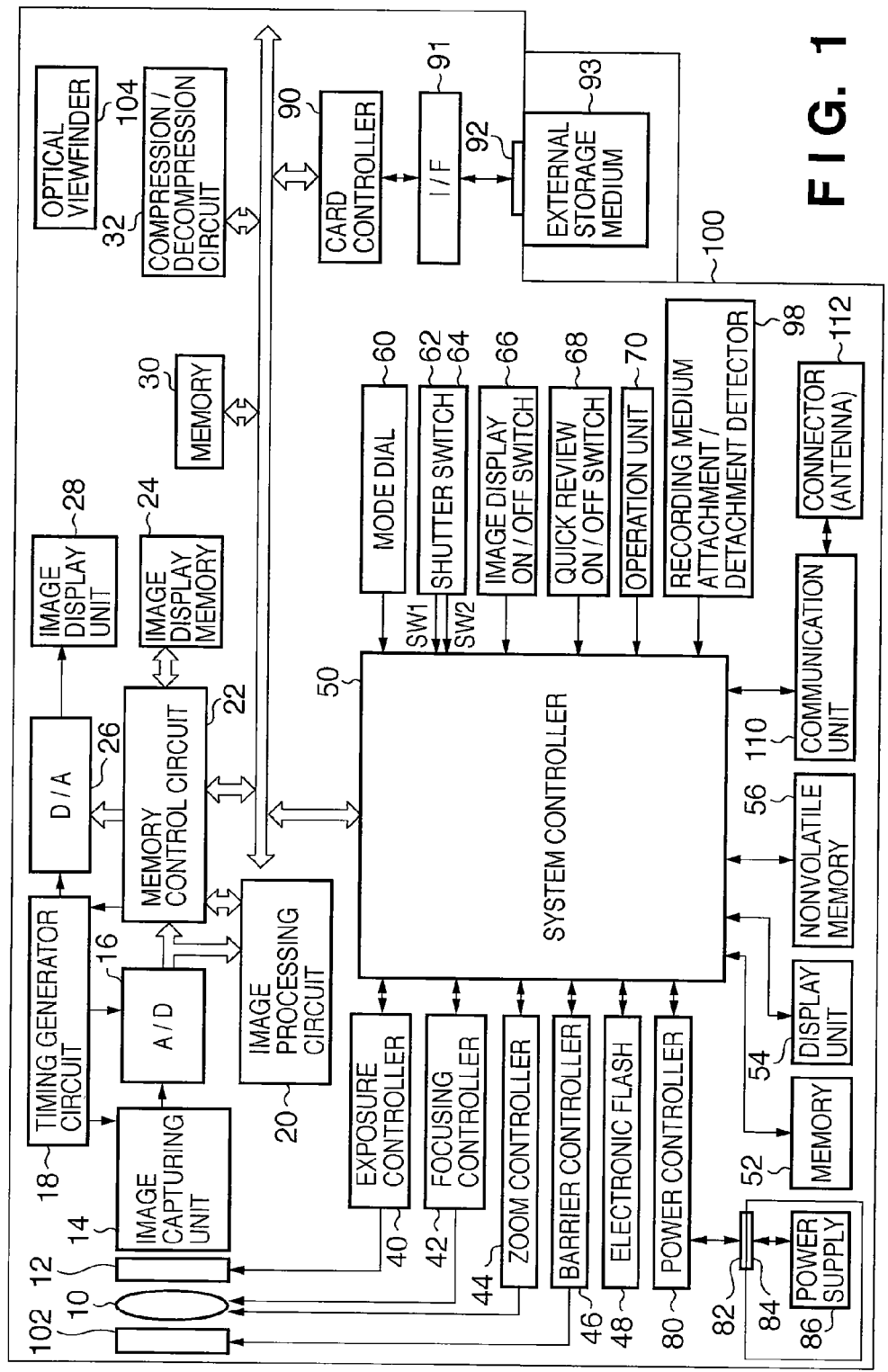
FIG. 1 is a block diagram showing the arrangement of an example of a digital camera as an image input apparatus which is applicable to an embodiment of the present invention.

FIG. 1 shows the arrangement of an example of a digital camera 100 as the image input apparatus which is applicable to the embodiment of the present invention. Light coming from an object becomes incident on an image capturing unit 14, which converts an optical image into an electrical signal and has an image sensing element of a CCD or CMOS sensor, via a photographing lens 10 and a shutter 12 having an aperture mechanism. An A/D converter 16 converts an analog signal output from the image capturing unit 14 into a digital signal, and outputs the digital signal as image data. A timing generation circuit 18 is controlled by a memory control circuit 22 and system controller 50, and supplies clock signals and control signals to the image capturing unit 14, the A/D converter 16, and a D/A converter 26.

An image processing circuit 20 applies predetermined pixel interpolation processing and color conversion processing to image data supplied from the A/D converter 16 or memory control circuit 22. The image processing circuit 20 executes predetermined arithmetic operation processing using image data supplied from the A/D converter 16. The arithmetic operation result is supplied to the system controller 50 via the memory control circuit 22. The system controller 50 controls an exposure controller 40, focusing controller 42, and electronic flash 48 based on this arithmetic operation result. As a result, TTL (Through-The-Lens) AF (Auto Focus) processing, AE (Auto Exposure) processing, and EF (Electronic Flash pre-emission) processing are executed. Furthermore, the image processing circuit 20 executes predetermined arithmetic operation processing using the captured image data supplied from the A/D converter 16, and also executes TTL AWB (Auto White Balance) processing based on the obtained arithmetic operation result.

The memory control circuit 22 controls the A/D converter 16, the timing generation circuit 18, the image processing circuit 20, an image display memory 24, the D/A converter 26, a memory 30, and a compression/decompression circuit 32. Image data output from the A/D converter 16 is supplied to the memory control circuit 22 via the image display memory 24 or directly. This image data is written in the image display memory 24 or the memory 30 by the memory control circuit 22.

An image display unit 28 as a display system displays supplied image data on a display device such as an LCD or organic EL display. Display image data written in the image display memory 24 is displayed by the image display unit 28 via the D/A converter 26. When image data captured by the image capturing unit 14 is sequentially displayed on the image display unit 28, an electronic viewfinder function can be implemented. The image display unit 28 can arbitrarily switch its display to ON or OFF in response to an instruction from the system controller 50. When the display of the image display unit 28 is OFF, the power consumption of the digital camera 100 can be greatly reduced.

The memory 30 stores captured still image data and moving image data, and has a storage capacity large enough to store a predetermined number of still image data or moving image data for a predetermined period of time. For this reason, in a continuous or panoramic shot mode in which a plurality of still images are continuously captured, a large number of images can be written in the memory 30 at high speed. Also, the memory 30 can be used as a work area of the system controller 50.

The compression/decompression circuit 32 loads an image stored in the memory 30, applies known data compression or decompression processing using adaptive discrete cosine transformation (ADCT) or wavelet transformation to the loaded image, and writes the processed data in the memory 30.

The exposure controller 40 controls the shutter 12 having the aperture function required to control an exposure amount on the image sensing element of the image capturing unit 14. The system controller 50 implements an electronic flash light control function by the electronic flash 48 based on the photometry result of the exposure controller 40.

The focusing controller 42 controls focusing of the photographing lens 10, and a zoom controller 44 controls zooming of the photographing lens 10. A barrier controller 46 controls the operation of a protection unit 102 serving as a barrier which covers the photographing lens 10 of the digital camera 100 to protect it from being contaminated or damaged. The electronic flash 48 serves as an auxiliary light source upon capturing an image, and also has a light control function. Also, the electronic flash 48 has an AF auxiliary light projection function. The exposure controller 40 and focusing controller 42 are controlled using the TTL system, and the system controller 50 controls the exposure controller 40 and focusing controller 42 based on the arithmetic operation result of the captured image data by the image processing circuit 20.

The system controller 50 includes, for example, a microprocessor. A memory 52 is, for example, a ROM, which stores, in advance, constants, variables, programs, and the like required to operate the system controller 50. The system controller 50 controls the overall digital camera 100 in accordance with the programs and the like stored in the memory 52.

The system controller 50 generates an output processing definition script (to be simply referred to as a script hereinafter), which defines output processing with respect to an image output apparatus, in accordance with a program. The system controller 50 transmits the generated script to the image output apparatus (not shown) via a communication unit 110 and connector (antenna) 112. When a script is transmitted from the image output apparatus (not shown), that script is received by the connector (antenna) 112, and is transferred from the communication unit 110 to the system controller 50. The system controller 50 interprets the script transferred from the communication unit 110, and controls the operation of the digital camera 100 based on the interpretation result.

A display unit 54 notifies operation states, messages, and the like using characters, images, sounds, and the like according to execution of programs by the system controller 50. One or a plurality of display units 54 are arranged at, for example, easy-to-see positions near an operation unit 70 of the digital camera 100, and include a combination of display elements such as an LCD and LEDs, a sound generation element, and the like. Some functions of the display units 54 are arranged inside an optical viewfinder 104.

Of the display contents of the display units 54, those which are displayed on the LCD include a single-shot/continuous-shot display, self timer display, compression ratio display, recording pixel count display, recorded image count display, remaining recordable image count display, and shutter speed display. Also, the display contents on the LCD include an aperture value display, exposure correction display, electronic flash display, red-eye reduction display, macro-shot display, buzzer setting display, clock battery remaining amount display, battery remaining amount display, error display, and plural-digit numerical information display. Furthermore, the display contents on the LCD include information of an external storage medium 93, an attached/detached state display of the external storage medium 93, and date/time display.

Of the display contents of the display units 54, those displayed within the optical viewfinder 104 include an in-focus display, camera-shake warning display, electronic flash charging display, shutter speed display, aperture value display, and exposure correction display.

A nonvolatile memory 56 uses, for example, an electrically erasable and programmable memory such as an EEPROM. The nonvolatile memory 56 stores, for example, various kinds of setting information of this digital camera 100.

A mode dial switch 60 is used to switch respective function modes of the digital camera 100, which include a power-OFF, auto photographing mode, photographing mode, panoramic shot mode, play mode, multi-window play/delete mode, and PC connection mode.

A shutter switch 62 (SW1 in FIG. 1) is used to start a photographing standby operation for AF and AE. A shutter switch 64 (SW2 in FIG. 1) is a photographing switch used to actually capture an image after the operation of the shutter switch 62. That is, the shutter switch 62 is activated when a shutter button is pressed to a half stroke position, and the shutter switch 64 is activated when the shutter button is pressed to a full stroke position.

An image display ON/OFF switch 66 is used to set ON/OFF of the image display unit 28. With this function, when an image is to be captured using the optical viewfinder 104, current supply to the image display unit 28 including the LCD is cut off, thus achieving power savings.

A quick review ON/OFF switch 68 is used to set a quick review function of automatically playing back captured image data immediately after the image is captured. Also, this switch 68 has a function of setting a quick review function when the image display unit 28 is OFF.

The operation unit 70 includes operation members such as various buttons and a touch panel, and accepts user operations. For example, the operation members included in the operation unit 70 include a menu button, set button, macro button, multi-window play page change button, electronic flash setting button, and single-shot/continuous-shot/self timer switching button. Also, the operation unit 70 further includes a menu move + (plus) button, menu move − (minus) button, play image move + (plus) button, play image move − (minus) button, and captured image quality selection button. Moreover, the operation unit 70 includes an exposure correction button, date/time setting button, image delete button, and image delete cancel button. These operation members may be configured using independent switches or as areas on the touch panel. The operation unit 70 may include arrow keys used to respectively designate the upper, lower, right, and left directions, and an enter key, and the functions of the respective operation members may be implemented by combining them with a cursor displayed on a setting screen displayed on the image display unit 28.

A power controller 80 includes a battery detection circuit, a DC-DC converter, and a switch circuit used to switch blocks to be energized. The power controller 80 detects the attachment/detachment, type, and remaining amount of a battery of a power supply 86, and controls the DC-DC converter based on the detection result and an instruction from the system controller 50, thus supplying required voltages to respective units including a recording medium for required periods of time.

The power supply 86 includes a primary battery such as an alkali battery or lithium battery, a secondary battery such as an NiCd battery, NiMH battery, or Li battery, and an AC adapter, and is connected to the power controller 80 via connectors 82 and 84.

An I/F (interface) 91 is an interface with the external storage medium 93, and records or plays back data on or from the external storage medium 93 under the control of a card controller 90 according to an instruction from the system controller 50. A connector 92 connects the external storage medium 93. A recording medium attachment/detachment detector 98 detects whether or not the external storage medium 93 is attached to the connector 92.

That is, image data captured by the image capturing unit 14 is compressed by the compression/decompression unit 32 to obtain compressed image data. This compressed image data is supplied to the external storage medium 93 via the card controller 90 and interface 91 and is stored as a file under the control of the system controller 50.

Using the optical viewfinder 104, an image can be captured without using the electronic viewfinder function of the image display unit 28. The optical viewfinder 104 includes some functions of the display units 54, for example, an in-focus display, camera-shake warning display, electronic flash charging display, shutter speed display, aperture value display, and exposure correction display.

The communication unit 110 controls data communications between this digital camera 100 and an external apparatus. For example, image data read out from the external storage medium 93 by the system controller 50 is transmitted to the external apparatus via the connector (antenna) 112 (to be described later) by the communication unit 110.

A communication method applicable to the communication unit 110 is not particularly limited as long as two-way data communications can be made with an external apparatus. For example, USB and IEEE1394 can be applied to the communication unit 110. Also, a wireless communication can be applied to the communication unit 110. The present invention is not limited to this, and RS232C, P1284, SCSI, modem, LAN, and the like may be applied to the communication unit 110.

The connector (antenna) 112 attains an electrical connection with an external apparatus when the communication unit 110 performs data communications with the external apparatus. When a wired communication method such as USB or IEEE1394 is applied to the communication unit 110, the connector (antenna) 112 has a structure including a physical contact terminal. That is, in this case, by physically contacting a terminal provided to a USB or IEEE1394 cable with that provided to the connector (antenna) 112, the communication unit 110 is electrically connected to the external apparatus. When a wireless communication method used to perform a wireless data communication is applied to the communication unit 110, the connector (antenna) 112 is configured as an antenna used to transmit/receive electric waves.

In this embodiment, assume that the communication unit 110 is configured to perform a wireless communication, and the connector (antenna) 112 is configured as an antenna. Also, in this embodiment, assume that the communication unit 110 and connector (antenna) 112 perform a data communication using a close proximity wireless communication, and the connector (antenna) 112 includes a transmission/reception circuit (not shown) used to transmit/receive data by a wireless communication.

The connector (antenna) 112 can detect connection and disconnection states of the close proximity wireless communication. For example, the connector (antenna) 112 performs communications with a connection destination apparatus at given intervals, and can determine that a communication is disconnected when no response is returned from the connection destination apparatus within a predetermined period of time. As for connection of a communication as well, for example, the connector (antenna) 112 attempts to perform a communication in a state in which no connection is established, and can determine that a communication is connected when a response is returned from the connection destination apparatus. However, the present invention is not limited to this. In a close proximity wireless communication of a type that supplies electric power to a connection destination apparatus by electromagnetic induction, when the connector (antenna) 112 is on the power supply side, the connection destination apparatus comes close to the connector (antenna) 112 to receive electric power, thus initiating a communication.

When the apparatus is separated away from the connector (antenna) 112, power supply stops to interrupt a communication. The connector (antenna) 112 detects the connection or disconnection state of a communication, and notifies the system controller 50 of the detected state.

Note that data to be exchanged by the communication unit 110 is not limited to captured image data, and includes the script used to define the output processing of the image output apparatus as the connection destination apparatus, as described above. Details of this script will be described later. Upon reception of the notification of the connection or disconnection state of the image output apparatus by a close proximity wireless communication, which is detected by the connector (antenna) 112, the system controller 50 generates the script to be transmitted to the image output apparatus according to the notified communication state. The generated script is transmitted to the image output apparatus as the connection destination via the communication unit 110 and connector (antenna) 112.

Figure 2:
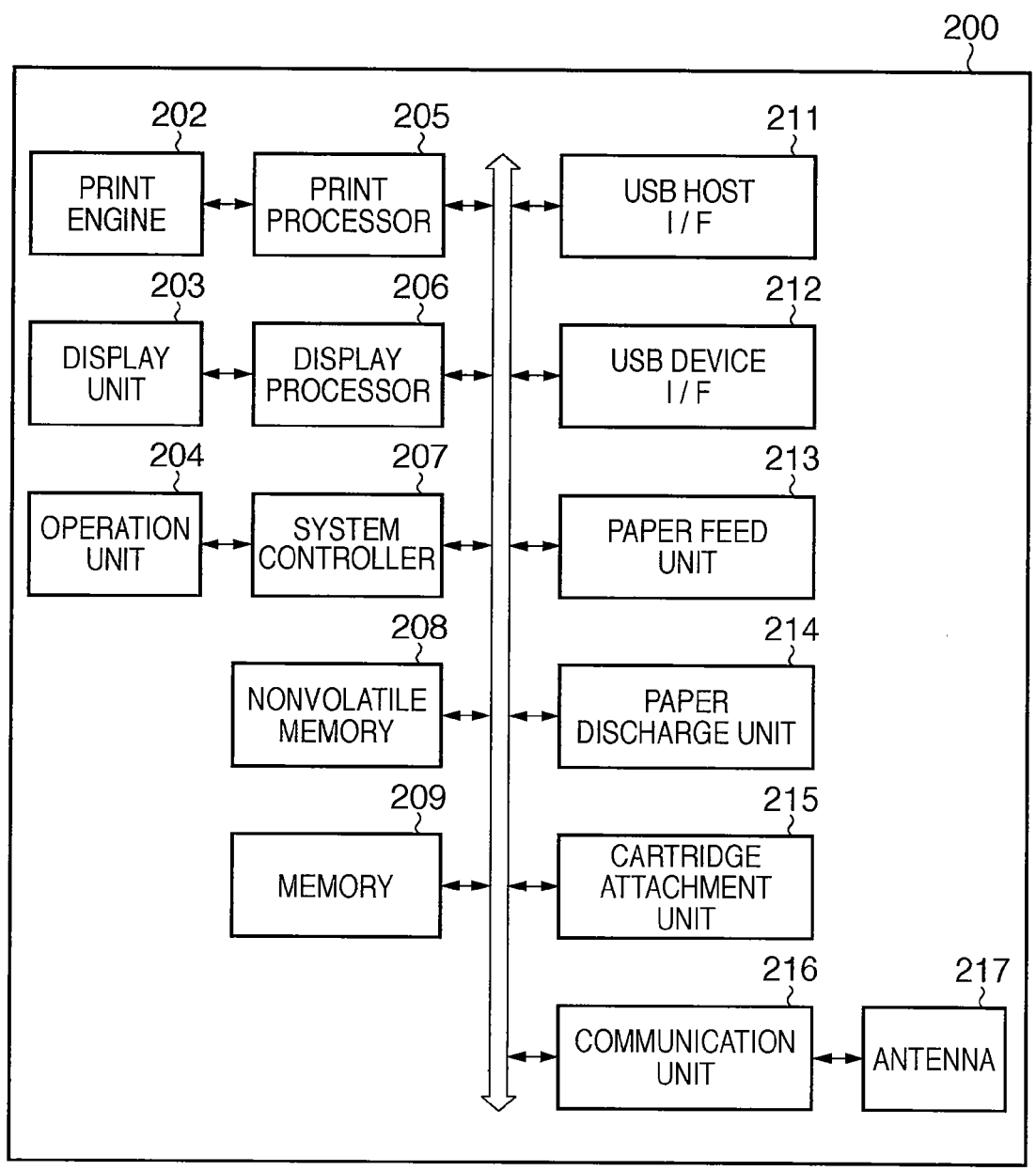
FIG. 2 is a block diagram showing the arrangement of an example of a printer as an image output apparatus which is applicable to the embodiment of the present invention.

FIG. 2 shows the arrangement of an example of a printer, 200 as the image output apparatus which is applicable to the embodiment of the present invention. A print engine 202 having an image output function actually prints an image on a paper sheet. A paper sheet is fed from a paper feed unit 213, a print processor 205 executes data print processing, an image is printed on the fed paper sheet using ink of an ink cartridge attached to a cartridge attachment unit 215, and the printed sheet is discharged from a paper discharge unit 214.

A system controller 207 includes, for example, a microprocessor, ROM, and RAM, and controls the overall printer 200 using the RAM as a work memory in accordance with programs stored in advance in the ROM. An operation unit 204 includes a plurality of operation members and accepts user operations. The operation members included in the operation unit 204 include one or a combination of a plurality of switches, a dial, a touch panel, a pointing device based on line-of-sight detection, and speech recognition device. Upon operation of the operation member included in the operation unit 204, a control signal according to that operation is supplied to the system controller 207. The system controller 207 controls the printer 200 to execute an operation according to the operation based on this control signal.

A display unit 203 includes a display device such as an LCD and LEDs, and an audio device which makes an audio output. A display processor 206 generates data to be displayed on the display unit 203 according to an instruction from the system controller 207, and supplies the generated data to the display unit 203.

A nonvolatile memory 208 uses, for example, an electrically erasable and programmable memory such as an EEPROM. The nonvolatile memory 208 can store wireless setting information of the printer 200. A memory 209 is a ROM which stores constants, variables, programs, and the like required to operate the printer.

A communication unit 216 controls a wireless communication to be made via an antenna 217. The antenna 217 is used to transmit/receive electric waves by a wireless communication, and includes a transmission/reception circuit (not shown) which transmits/receives data by a wireless communication. In this embodiment, assume that the communication unit 216 and antenna 217 are configured to perform a close proximity wireless communication.

The antenna 217 can detect connection and disconnection states of the close proximity wireless communication. For example, the antenna 217 performs communications with a connection destination apparatus at given intervals, and can determine that a communication is disconnected when no response is returned from the connection destination apparatus within a predetermined period of time. As for connection of a communication as well, for example, the antenna 217 attempts to perform a communication in a state in which no connection is established, and can determine that a communication is connected when a response is returned from the connection destination apparatus. However, the present invention is not limited to this. In a close proximity wireless communication of a type that supplies electric power to a connection destination apparatus by electromagnetic induction, when the antenna 217 is on the power supply side, the connection destination apparatus comes close to the antenna 217 to receive electric power, thus initiating a communication. When the apparatus is separated away from the antenna 217, power supply stops to interrupt a communication. The antenna 217 detects the connection or disconnection state of a communication, and notifies the system controller 207 of the detected state.

The system controller 207 generates an script to be transmitted to the image input apparatus as the connection destination apparatus in accordance with the communication state notified from the antenna 217. The generated script is transmitted to the image input apparatus as the connection destination via the communication unit 216 and antenna 217.

A USB host interface 211 is a USB interface used to connect an external host apparatus such as a personal computer using USB. A USB device interface 212 is a USB interface used to connect an external device such as a digital camera using USB.

Note that each of the aforementioned digital camera 100 and printer 200 may be controlled by one hardware component, or a plurality of hardware components may share their roles and may serve as a single controller as a whole.

Figure 3:
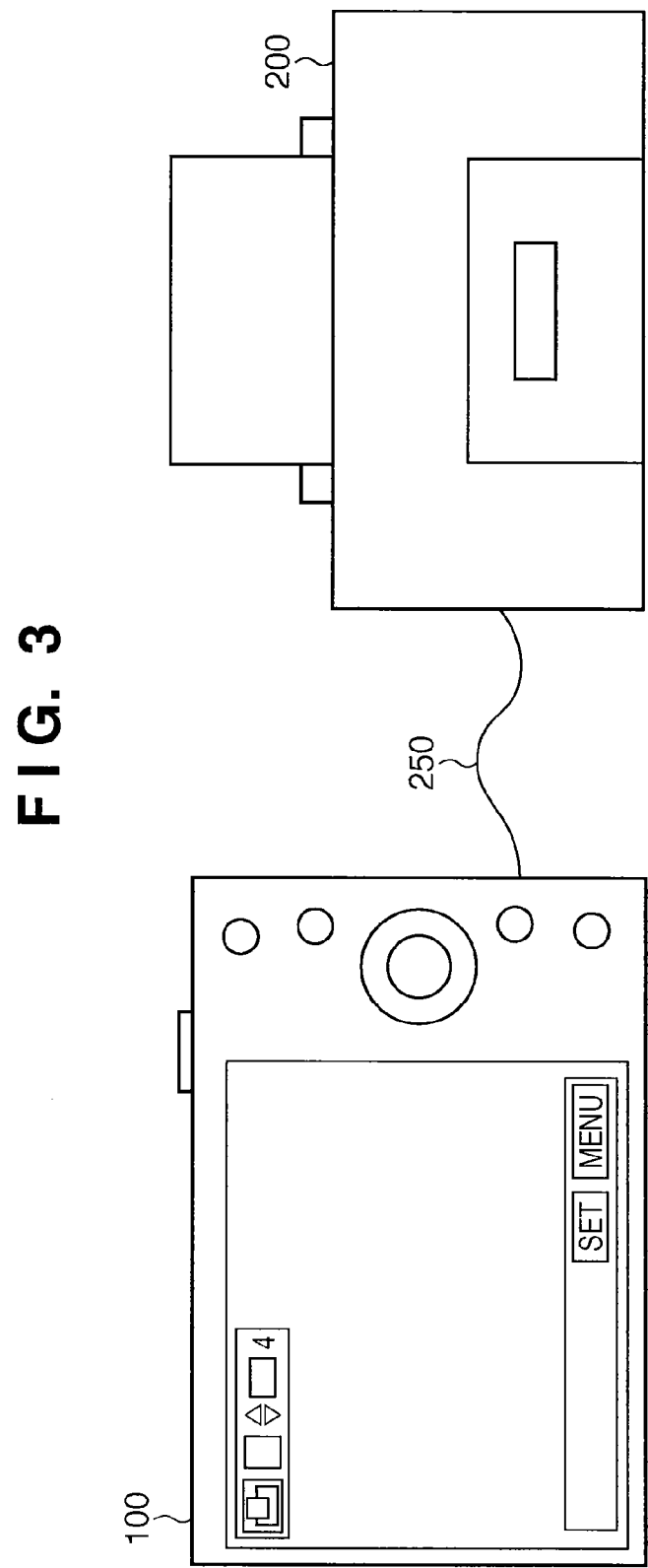
FIG. 3 is a view for explaining a general example in which the digital camera and printer are connected via a cable to perform communications.

Prior to a description of a communication control method using the close proximity wireless communication according to the embodiment of the present invention, a general example in which the digital camera 100 and printer 200 are connected via, for example, a USB cable 250 to perform wired communications, as exemplified in FIG. 3, will be described. That is, direct print processing is executed by directly transmitting image data output from the digital camera 100 to the printer 200 via the USB cable 250 and controlling the printer 200 to print an image. In this case, the connector (antenna) 112 of the digital camera 100 side is configured as a USB-compatible connector.

In the direct print processing, the image input and output apparatuses are directly connected via the USB cable or the like, and image data transferred from the image input apparatus is output on the image output apparatus side. As a standard that implements this direct print processing, PictBridge is available, and is specified by specifications "CIPA DC-001-2003" prepared by CIPA (Camera & Imaging Products Association). Assume that the digital camera 100 and printer 200 can perform operations compliant with the PictBridge standard.

Figure 4:
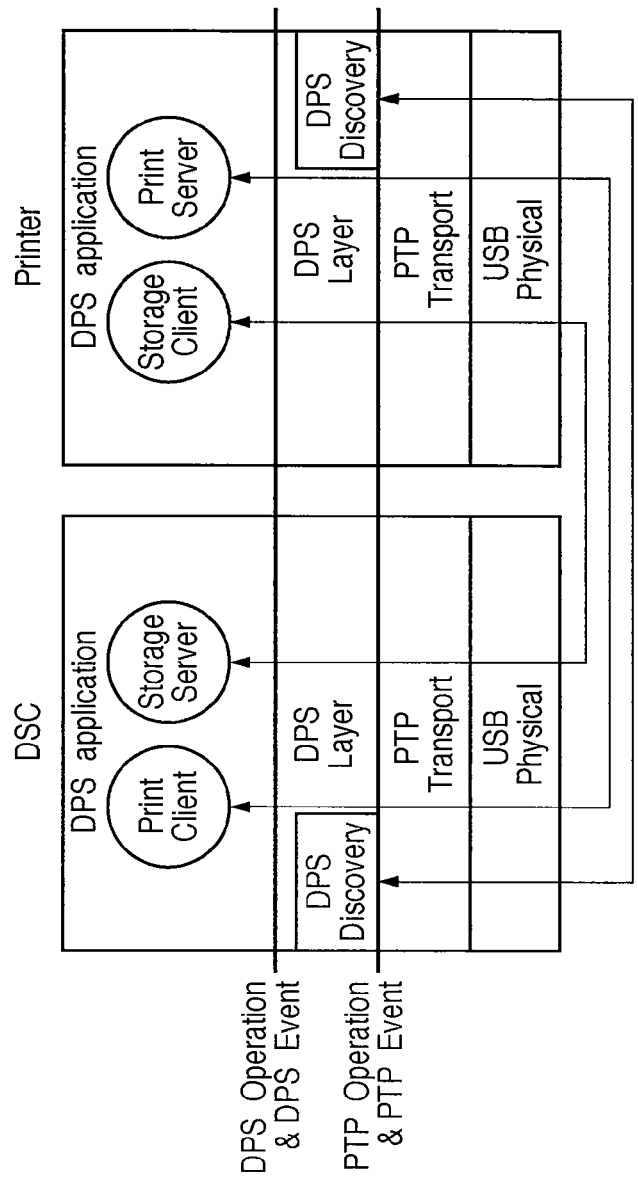
FIG. 4 is a view for explaining a communication protocol architecture based on PictBridge.

FIG. 4 shows a communication protocol architecture based on PictBridge. For example, USB is used as a physical communication layer as a lowermost layer, and PTP is used as a communication protocol of a transport layer above the physical communication layer. Note that "PTP" is a short for Picture Transfer Protocol. A DPS layer is interposed between the PTP transport layer and an uppermost DPS application layer to attain mapping with the PTP protocol. The PictBridge specifies an interface protocol between the DPS layer and DPS application layer.

As a PictBridge software component, DPS Discovery at the DPS layer is specified. In addition, DPS Print Server and Client and DPS Storage Server and Client are specified at the DPS application layer. DPS Discovery is a component which negotiates as to whether or not the connected mating apparatuses have a DPS function.

The operations of the DPS application will be described by a server/client model. That is, in the DPS application, each DPS operation is completed in a sequence in which a server responds to a request from a client, and the server returns the result to the client. Also, each DPS event is completed in a sequence in which the client responds to a notification issued from the server, and returns a receive confirmation to the server.

Figure 5:
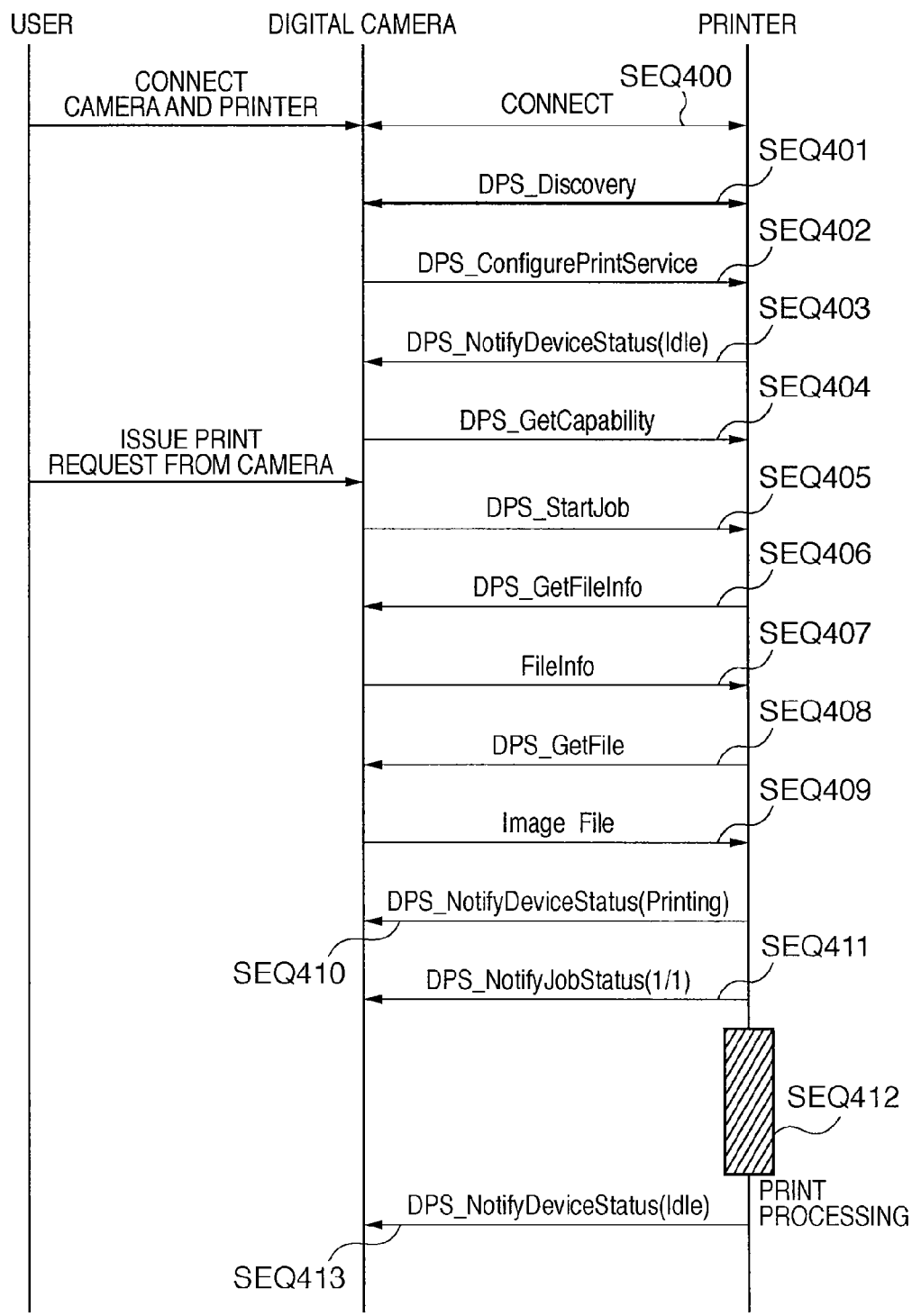
FIG. 5 is a sequence chart showing the sequence of an example in which image data of one file stored in an external storage medium in the digital camera is output by the printer using PictBridge.

FIG. 5 shows the sequence of an example when image data of one file stored in the external storage medium 93 in the digital camera 100 is output by the printer 200 using PictBridge. In this case, a general example in which no disconnection of a communication or the like occurs will be especially explained.

When the user connects the digital camera 100 and printer 200 via the USB cable 250, an electrical connection is generated between the digital camera 100 and printer 200 via the USB cable 250 (SEQ 400). Then, the digital camera 100 and printer 200 execute DPS Discovery processing (SEQ 401) to negotiate with each other as to whether or not they are compatible to direct print based on PictBridge.

As a result of the DPS Discovery processing, when both the digital camera 100 and printer 200 are compatible to direct print based on PictBridge, the digital camera 100 transmits a DPS_ConfigurePrintService script to the printer 200 (SEQ 402). With this script, the digital camera 100 notifies the printer 200 of its information. In response to this DPS_ConfigurePrintService script, the printer 200 returns, to the digital camera 100, a response script including parameters such as a tag dpsVersion, tag productName, and tag vendorName. The digital camera 100 can identify the printer 200 based on these parameters such as the tag dpsVersion, tag productName, and tag vendorName. These parameters such as the tag dpsVersion, tag productName, and tag vendorName are stored in, for example, the memory 30 or nonvolatile memory 56 of the digital camera 100.

When the printer 200 acquires the information of the digital camera 100 from the DPS_ConfigurePrintService script, it transmits a DPS_NotifyDeviceStatus script to the digital camera 100 (SEQ 403). With this DPS_NotifyDeviceStatus script, the status of the printer 200 (idle status in this case) is transmitted to the digital camera 100. Thus, the printer 200 notifies the digital camera 100 that it is ready to receive print processing.

The digital camera 100 transmits a DPS_GetCapability script to the printer 200 to inquire the printer 200 about its capability information (SEQ 404). The capability information of the printer includes parameters indicating paper sizes and paper types that can be handled by the printer, formats of image files that can be output, and compatibility to date printing, file name printing, image correction, layout printing, fixed size printing, and trimming printing. The digital camera 100 transmits a DPS_StartJob script to the printer 200 after it recognizes this capability information of the printer 200 to issue a print start request according to the capability information (SEQ 405). Details of the DPS_StartJob script will be described later.

In response to the print start request in SEQ 405, the printer 200 transmits a DPS_GetFileInfo script to the digital camera 100 (SEQ 406). This DPS_GetFileInfo script requests the digital camera 100 to send file information based on a file ID of image data which is designated to be printed. In response to the DPS_GetFileInfo script, the digital camera 100 transmits file information (FileInfo) to the printer 200 (SEQ 407). This file information includes information such as a file capacity (file size), the presence/absence of a thumbnail image, and file attributes.

The printer 200 receives the file information transmitted in SEQ 407, and determines if a file indicated by the file information is processible. If it is determined that the file is processible, the printer 200 transmits a DPS_GetFile script to the digital camera 100 to request it to send that file (SEQ 408). The digital camera 100 transmits image data of the file (Image File) requested by the DPS_GetFile script to the printer 200 (SEQ 409).

Upon reception of the image data transmitted in SEQ 409, the printer 200 transmits a DPS_NotifyDeviceStatus script including status information indicating printing in progress (Printing) to the digital camera 100 (SEQ 410). Furthermore, the printer 200 notifies the camera of the print progress status using a DPS_NotifyJobStatus script (SEQ 411). Then, the printer 200 starts printing of the image data received in SEQ 409 (SEQ 412).

Upon completion of the print processing, the printer 200 transmits a DPS_NotifyDeviceStatus script including status information indicating an idle state (Idle) to the digital camera 100 (SEQ 413). This DPS_NotifyDeviceStatus script notifies the digital camera 100 that the printer 200 is in an idle state.

Note that the issuance timings of the aforementioned DPS_NotifyJobStatus script and DPS_NotifyDeviceStatus script and the acquisition order of the image data are examples, and various cases may occur depending on implementations. When communications are made using the close proximity wireless communication in place of USB, the same sequence as the print sequence exemplified in FIG. 5 is executed if no communication disconnection occurs.

Scripts closely related to the embodiment of the present invention of those defined in PictBridge will be described below. Note that a script of PictBridge is described using XML (Extensible Markup Language). The XML is a language that describes information using tags which can be uniquely defined. A tag generally includes a pair of symbols indicating the start or end of a range. A start tag indicating the start of a range is expressed by bounding a character string, which is defined in advance, by symbols "<" and ">". An end tag indicating the end is expressed by bounding the same character string as that described in the start tag by symbols "</" and ">".

A range designated by the pair of tags can have an arbitrary meaning by the character string bounded by the symbols "<" and ">" (or the symbols "</" and ">"). Each tag can include a description of a predetermined parameter. The tags can adopt a nested structure. In general, in the description of an XML file, the nesting level is expressed by the depth of an indent of each line.

FIG. 6 shows the structure of an example of the DPS_StartJob script. The DPS_StartJob script is a script used when the digital camera 100 issues a print start request to the printer 200. A tag startJob indicates that this script is DPS_StartJob. A tag jobConfig described within a range designated by the tag startJob indicates that a configuration of this print job is described within this range. Likewise, a tag printInfo indicates that print information is described within this range.

In the configuration, a tag quality describes a value indicating print image quality (for example, standard or high image quality). A tag paperSize describes a value indicating a paper size. A tag paperType describes a value indicating a paper type (for example, plain paper, photo paper, or ink-jet paper). A tag fileType describes a value that designates a type of an image file to be printed. For example, when a DPOF file is used, that type is designated by this tag fileType.

A tag datePrint describes a value indicating the presence/absence of date printing. A tag fileNamePrint describes a value indicating the presence/absence of file name printing. A tag imageOptimize describes a value indicating whether or not to apply image correction. A tag fixedSize describes a value indicating whether or not to execute fixed size printing. A tag cropping describes a value indicating whether or not to execute trimming printing.

In the print information, a tag fileID describes a file ID of a file that stores image data to be printed. A tag date describes date information.

FIG. 7 shows the structure of an example of the DPS_NotifyDeviceStatus script. The DPS_NotifyDeviceStatus script is used when the printer 200 notifies the digital camera 100 of its status. A tag notifyDeviceStatus indicates that this script is the DPS_NotifyDeviceStatus script.

A tag dpsPrintServiceStatus describes a value indicating the status of the printer 200. The status of the printer 200 includes "idle", "printing", and "paused". A tag jobEndReason describes a value indicating the end status of print processing. Upon completion of printing of the last page, the printer 200 notifies the digital camera 100 of this end status. A tag errorStatus describes a value indicating an error status of the completed print processing. The printer 200 notifies this status when an error has occurred. A tag errorReason describes a value indicating the reason of occurrence of an error. This tag is used together with the tag errorStatus.

A tag disconnectEnable describes a value indicating whether or not printing can be made even after a communication is disconnected. A tag capabilityChanged describes a value indicating whether or not the capability information in the printer 200 has changed. A tag newJobOK describes a value indicating whether or not the printer 200 can accept a print request.

FIG. 8 shows the structure of an example of the DPS_NotifyJobStatus script. The DPS_NotifyJobStatus script is used when the printer 200 notifies the digital camera 100 of the print progress status. A tag notifyJobStatus indicates that this script is the DPS_NotifyJobStatus script. A tag progress describes a value indicating the number of images designated by a print request, and a value indicating the number of order of the currently printed image, using 3-digit decimal values. For example, when a print request of six images is issued, and printing of the fourth image is started, a character string "004/006" is embedded in the tag progress, as exemplified in FIG. 8. A tag imagesPrinted describes a value indicating the number of printed images when a plurality of images to be printed are designated, using a 3-digit decimal value.

In print processing using PictBridge, required parameters are embedded in tags in scripts, and the scripts are exchanged between the digital camera and printer, thus executing the print processing.

Embodiment

Communication processing according to the embodiment of the present invention will be described below. In the embodiment of the present invention, a communication between the digital camera 100 and printer 200 is made by the close proximity wireless communication based on the aforementioned communication protocol under assumption that a communication distance is less than 1 m and, more particularly, several 10 cm. In this case, a communicable range exists, as shown in FIGS. 9A and 9B. If transmission/reception units of the close proximity wireless communication in the digital camera 100 and printer 200 fall outside this communicable range, they cannot communicate with each other.

That is, as exemplified in FIG. 9A, when the positions of the transmission/reception units of the close proximity wireless communication in the digital camera 100 and printer 200 fall within the communicable range, the digital camera 100 and printer 200 can perform close proximity wireless communications. On the other hand, for example, assume that the user moves with the digital camera 100, and the positions of the transmission/reception units of the close proximity wireless communication in the digital camera 100 and printer 200 fall outside the communication caverage, as exemplified in FIG. 9B. In this case, the close proximity wireless communication between the digital camera 100 and printer 200 is disconnected. When the user moves the digital camera 100 closer to the printer 200 from the state in FIG. 9B to the state in FIG. 9A, the close proximity wireless communication is resumed.

Note that the state in which "the positions of the transmission/reception units of the close proximity wireless communication in the digital camera 100 and printer 200 fall within the communicable range" will be described as "the digital camera 100 and printer 200 fall within the communicable range", for the sake of simplicity. Likewise, the state in which "the positions of the transmission/reception units of the close proximity wireless communication in the digital camera 100 and printer 200 fall outside the communicable range" will be described as "the digital camera 100 and printer 200 fall outside the communicable range".

In the embodiment of the present invention, PictBridge direct print is attained using the close proximity wireless communication. Under this precondition, the embodiment of the present invention relates to processing when a communication is disconnected since the transmission/reception units of the close proximity wireless communication in the digital camera 100 and printer 200 fall outside the communicable range, and the communication is resumed when the transmission/reception units fall within the communicable range.

That is, the digital camera 100 transmits a print request to the printer 200 in a close proximity wireless communication possible state, and the printer 200 starts print processing in response to this print request. After that, when the distance between the digital camera 100 and printer 200 exceeds the communicable range and a communication disconnection occurs, the print processing of the printer 200 is suspended. Then, this embodiment allows changing print processing of the printer 200 after a communication is established again after this suspension of the print processing.

This suspension timing includes a suspension timing after printing of image data for one paper sheet, which is executed at that time, is completed, or an immediate suspension timing in the middle of printing of image data for one paper sheet, which is executed at that time. Furthermore, the print processing may be suspended when printing for all image data that have already been acquired from the digital camera 100 is complete. A case will be explained below wherein print processing is suspended after completion of printing of image data for one paper sheet, which is executed at that time, and the printer is set in a pause state.

The print processing is changed by changing a script which is transmitted from the digital camera 100 to the printer 200 when a communication is established again after a communication disconnection. For example, the processing to be executed by the printer 200 when a communication is established again includes (1) to cancel the suspended print processing, (2) to resume the suspended print processing, and (3) to cancel the suspended print processing and to start new print processing.

Figure 10:
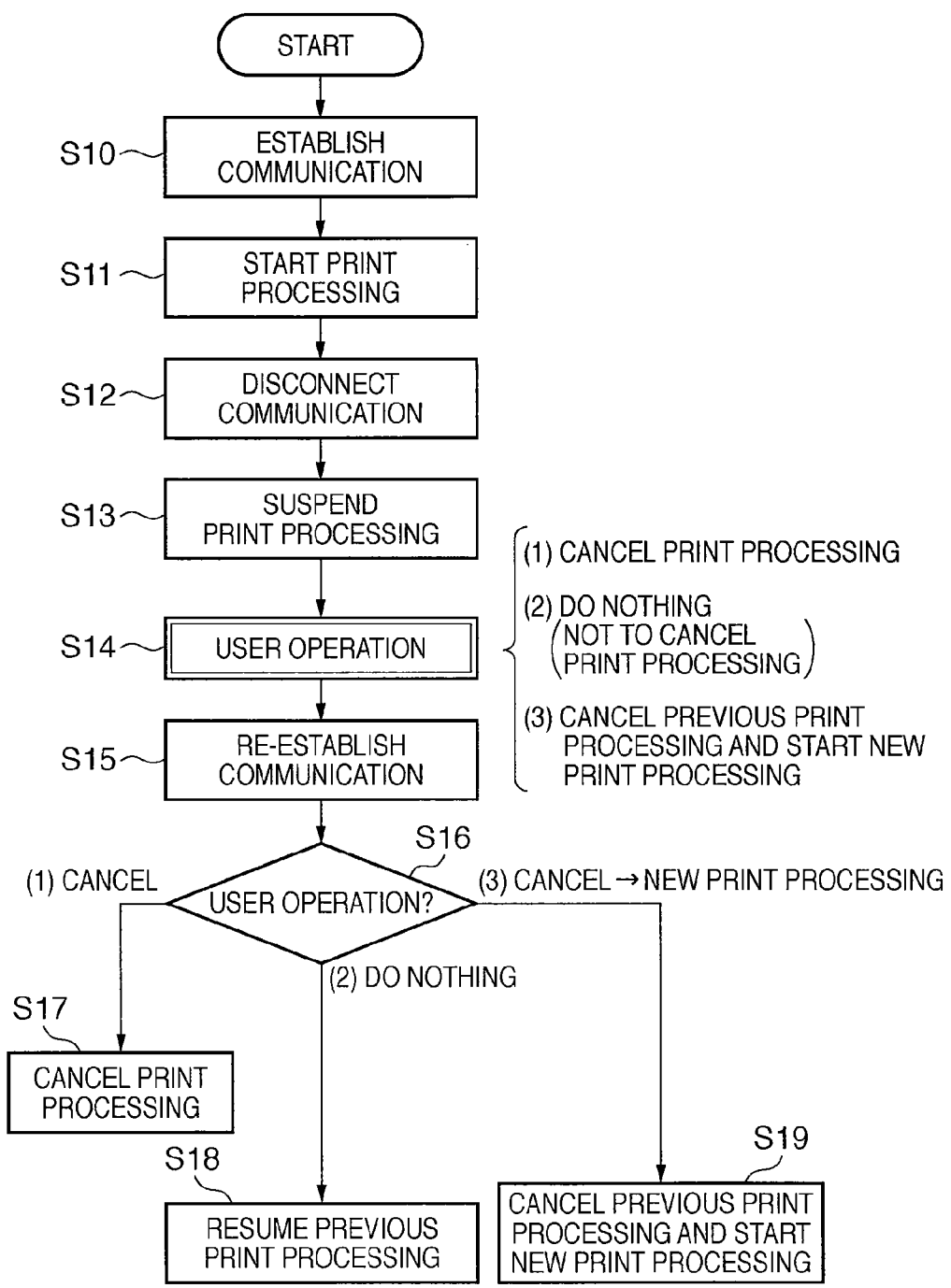
FIG. 10 is a flowchart schematically showing the sequence of processing according to the embodiment of the present invention.

FIG. 10 is a flowchart schematically showing the sequence of processing according to the embodiment of the present invention. When a close proximity wireless communication is established between the digital camera 100 and printer 200 (step S10), image data is transferred from the digital camera 100 to the printer 200, and the printer 200 starts print processing of this image data (step S11).

When the user moves the digital camera 100 away from the printer 200 during the print processing which is started by the printer 200 in step S11, and the digital camera 100 and printer 200 fall outside the communicable range, the communication is disconnected (step S12). If the communication is disconnected, the printer 200 suspends the print processing started in step S11, and is set in a pause state (step S13).

The digital camera 100 displays a selection screen and accepts a user operation while the printer 200 is in the pause state (step S14). The user can make a setting associated with the operation of the printer 200 after a communication between the digital camera 100 and printer 200 is established again. In this embodiment, the user can set the following three different operations (1) to (3):

(1) to cancel the suspended print processing;
(2) to resume the suspended print processing; and
(3) to cancel the suspended print processing, and to start new print processing.

Note that of these operations (1) to (3), (2) "to resume the suspended print processing" is set when the user makes no operation with respect to the digital camera 100 in step S14. When the user selects (3) "to cancel the suspended print processing and to start new print processing", he or she sets in the digital camera 100 to cancel the print processing suspended in step S13 and to execute new print processing.

When the user moves the digital camera 100 closer to the printer 200, and the digital camera 100 and printer 200 fall within the communicable range, a close proximity wireless communication is established again (step S15). Then, the digital camera 100 transmits information indicating the operation of the printer 200 set based on the user operation in step S14 to the printer 200.

The printer 200 decides the subsequent processing according to this information transmitted from the digital camera 100 (step S16). That is, if the user operation in step S14 is (1) "to cancel the suspended print processing", the process advances to step S17 to cancel the print processing suspended in step S13. If the user operation in step S14 is (2) "to resume the suspended print processing", the process advances to step S18 to resume the print processing suspended in step S13. Furthermore, if the user operation in step S14 is (3) "to cancel the suspended print processing and to start new print processing", the process advances to step S19. In step S19, the print processing suspended in step S13 is canceled, and new print processing is started.

<Cancel Suspended Print Processing>

Figure 11:
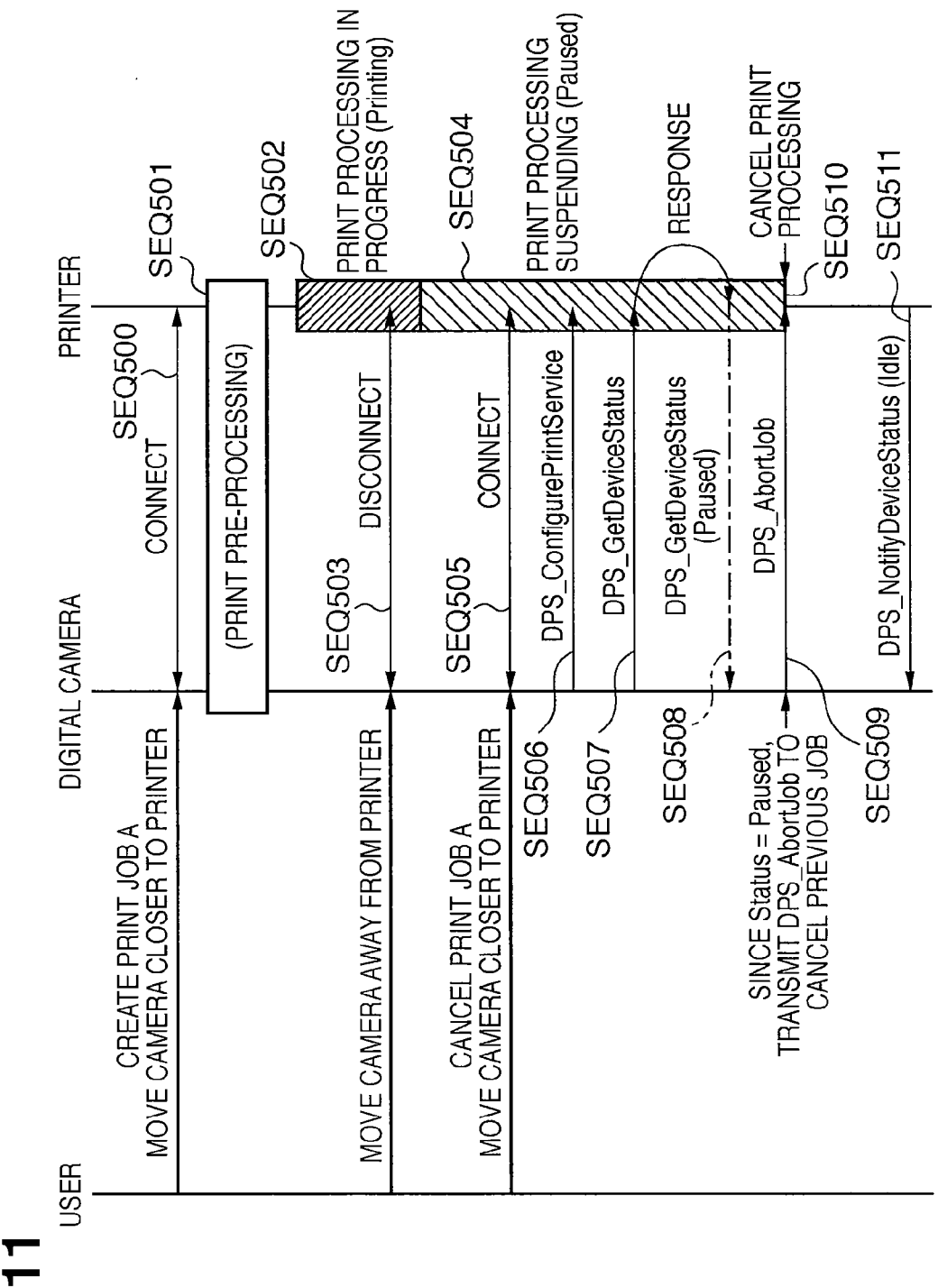
FIG. 11 is a sequence chart showing the sequence of an example in which a suspended print job is canceled according to the embodiment of the present invention.

An example of (1) "to cancel the suspended print processing" will be described first. FIG. 11 shows the sequence of an example when a suspended print job is to be canceled. The user creates print job A, and moves the digital camera 100 closer to the printer 200. When the digital camera 100 falls within the communicable range of the printer 200, the digital camera 100 and printer 200 are connected by a close proximity wireless communication (SEQ 500).

When the digital camera 100 and printer 200 are connected by the close proximity wireless communication, print pre-processing is executed in SEQ 501, and print processing is started. That is, in SEQ 501, by the processes in SEQ 401 to SEQ 411 described using FIG. 5, the negotiation (SEQ 401) based on the DPS Discovery processing is executed. After that, pieces of mutual information are exchanged using scripts (SEQ 402 to SEQ 404). The digital camera 100 then transmits a print request based on print job A to the printer 200. The printer 200 starts print processing of image data transmitted from the digital camera 100 (image data transmission step) (SEQ 405 to SEQ 411).

During the print processing (SEQ 502), for example, when the user moves the digital camera 100 away from the printer 200, and the digital camera 100 falls outside the communicable range of the printer 200, the close proximity wireless communication is disconnected (SEQ 503). When the communication is disconnected, the printer 200 suspends the print processing after completion of printing of currently printed image data for one paper sheet (SEQ 504), and is set in a pause state.

Figure 12:
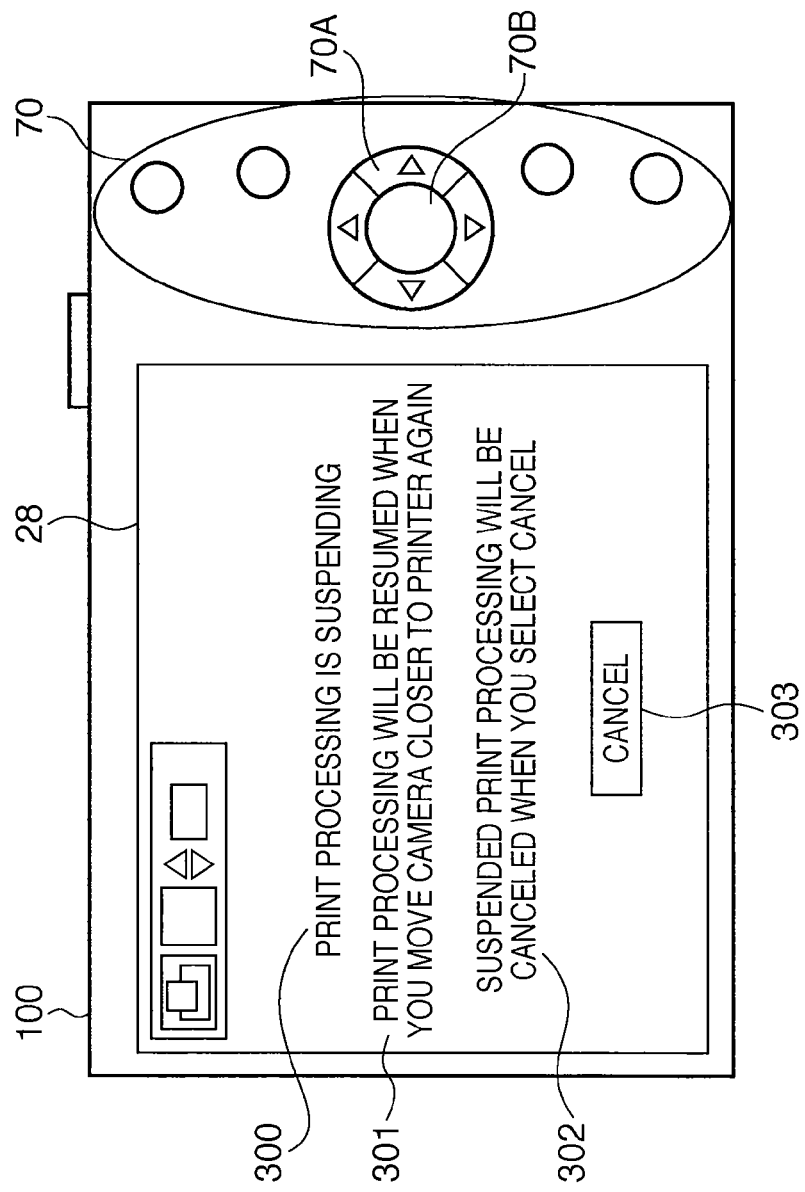
FIG. 12 is a view showing an example of messages displayed on an image display unit of the digital camera.

At the time of occurrence of a communication disconnection in SEQ 503, the system controller 50 displays a message 300 that notifies the user that the print processing is suspending, as exemplified in FIG. 12, on the image display unit 28 of the digital camera 100. Also, the system controller 50 displays a message 301 that notifies the user that when he or she moves the digital camera 100 closer to the printer 200 again, the suspended print processing will be resumed. Furthermore, the system controller 50 displays a message 302 to prompt the user to cancel the suspended print processing on the image display unit 28, and also displays a cancel button 303 in correspondence with the message 302. In this manner, the displays which indicate output processes that allow the user to designate from the digital camera 100 to the printer 200 are made on the image display unit 28.

The user can operate the cancel button 303 when he or she selects that button by operating arrow keys 70A which are provided on, for example, the operation unit 70, and are used to designate up, down, right, and left directions, and then operating an enter key 70B used to decide the selected item. In order to cancel the suspended print processing, the user operates the cancel button 303 using the operation members of the operation unit 70, for example, the arrow keys 70A and enter key 70B, and moves the digital camera 100 closer to the printer 200 again.

Since the user moves the digital camera 100 closer to the printer 200, a communication between the digital camera 100 and printer 200 is established again (SEQ 505). Then, the digital camera 100 transmits a DPS_ConfigurePrintService script to the printer 200 (SEQ 506). Upon reception of this DPS_ConfigurePrintService script, the printer 200 returns a response with respect to this received script to the digital camera 100 using a response script.

Upon reception of the response script from the printer 200, the digital camera 100 acquires parameters such as a tag dpsVersion, tag productName, and tag vendorName included in the received response script. The digital camera 100 compares these acquired parameters with those before occurrence of a communication disconnection in SEQ 503. Then, as a result of comparison, the digital camera 100 determines if the currently connected printer is the same as that connected upon establishing a previous communication.

For example, the system controller 50 reads out parameters such as a tag dpsVersion, tag productName, and tag vendorName included in the response script, which is returned from the printer 200 in response to the script transmitted in SEQ 402, from the memory 30 or nonvolatile memory 56. Then, the system controller 50 compares these readout parameters with the currently acquired parameters.

As a result of comparison of the parameters, if the currently connected printer is different from that connected upon establishing a previous communication, the system controller 50 of the digital camera 100 displays a message indicating that print processing cannot be continued on the image display unit 28. Likewise, the system controller 207 of the printer 200 displays a message indicating that print processing cannot be continued on the display unit 203.

On the other hand, if it is determined as a result of comparison of the parameters that the currently connected printer is the same as that connected upon establishing a previous communication, the digital camera 100 transmits a DPS_GetDeviceStatus script to the printer 200 so as to grasp the status of the printer 200 (SEQ 507).

As described above, according to the embodiment of the present invention, when a communication disconnection of the close proximity wireless communication has occurred during print processing of image data from the digital camera 100, the printer 200 suspends the print processing which is being executed. Therefore, the printer 200 transmits a response script indicating a pause state (Paused) to the digital camera 100 in response to the DPS_GetDeviceStatus script (SEQ 508).

Upon reception of the response script indicating the pause state, the digital camera 100 transmits a DPS_AbortJob script to the printer 200 so as to cancel the suspended print processing (SEQ 509). Upon reception of this DPS_AbortJob script, the printer 200 aborts the suspended print processing (SEQ 510). When the print processing is aborted, and the printer 200 is set in an idle state (Idle), it transmits a DPS_NotifyDeviceStatus script to the digital camera 100 to notify it of that status (SEQ 511).

When the result of the status inquiry request from the digital camera 100 to the printer 200 in SEQ 507 indicates that print processing is in progress, the digital camera 100 instructs the printer 200 to execute print abort processing. This process is implemented when the digital camera 100 changes a parameter of a tag abortStyle in the DPS_AbortJob script and transmits that script to the printer 200.

In the tag abortStyle, the digital camera 100 can designate the type of print abort processing of the printer 200. More specifically, the digital camera 100 can designate whether print processing is immediately aborted even during printing or it is aborted after currently printed image data is printed on one paper sheet. The abort type of print processing may be changed in user settings of the digital camera 100 or printer 200. In this case as well, after completion of the print abort processing, the printer 200 transmits a DPS_NotifyDeviceStatus script to the digital camera 100 as in SEQ 510 in FIG. 11, so as to notify the digital camera 100 of the idle state.

<Resume Suspended Print Processing>

Figure 13:
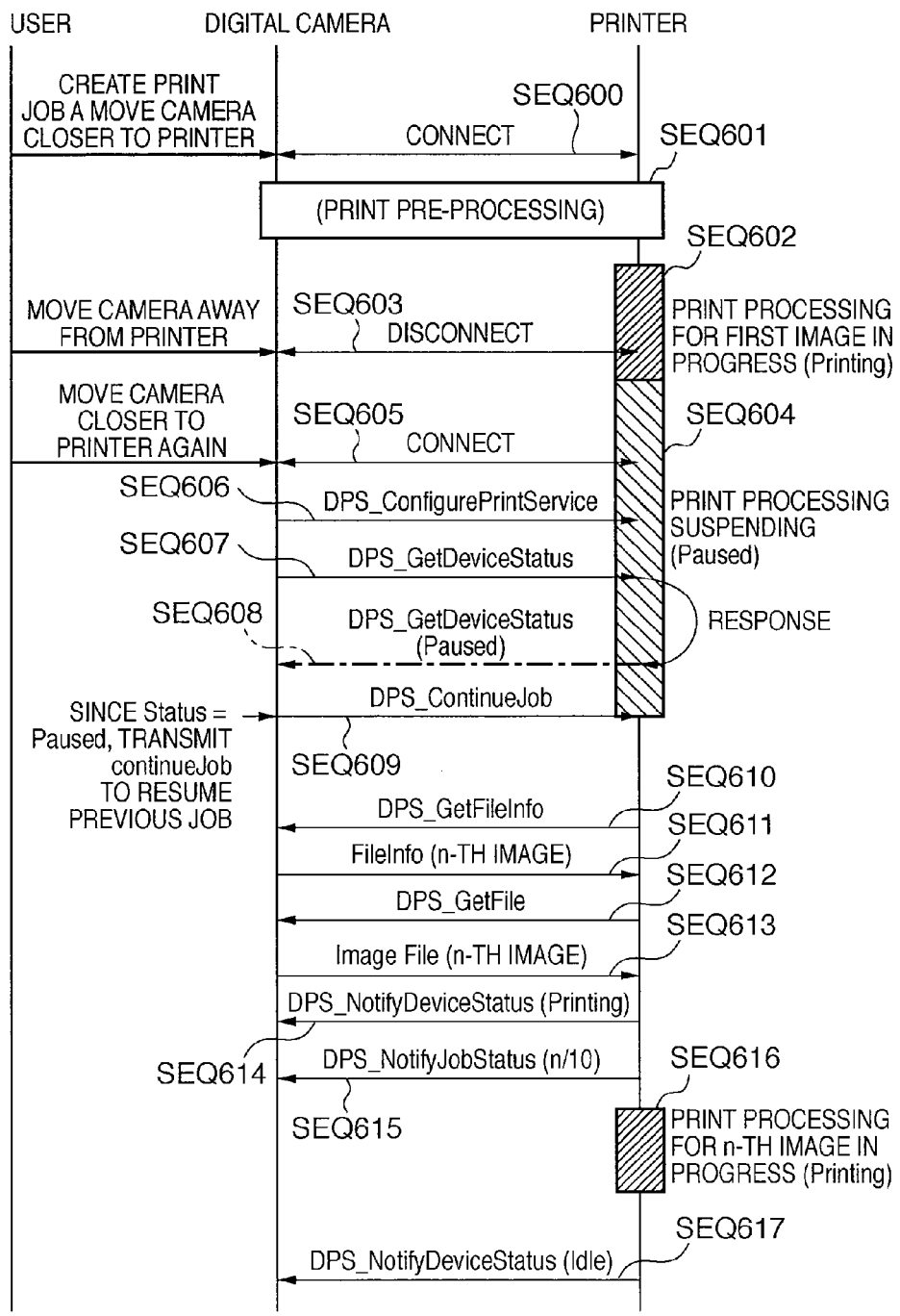
FIG. 13 is a sequence chart showing the sequence of an example in which suspended print processing is resumed according to the embodiment of the present invention.

An example of (2) "to resume the suspended print processing" will be described below. FIG. 13 shows the sequence of an example upon resuming the suspended print processing. A case will be exemplified below wherein the digital camera 100 gives the instruction for a print request for image data for 10 paper sheets to the printer 200.

The sequences of SEQ 600 and SEQ 601 are the same as those of SEQ 500 and SEQ 501 in FIG. 11 above. That is, when the user creates print job A, and moves the digital camera 100 closer to the printer 200, the digital camera 100 and printer 200 are connected by a close proximity wireless communication (SEQ 600). In SEQ 601, the printer 200 executes print pre-processing by the aforementioned processes in SEQ 401 to SEQ 411 described using FIG. 5, and starts print processing.

During the print processing (SEQ 602), when the digital camera 100 falls outside the communicable range of the printer 200, the close proximity wireless communication is disconnected (SEQ 603). When the communication is disconnected, the printer 200 suspends the print processing after completion of printing of currently printed image data for, for example, the first paper sheet (SEQ 604), and is set in a pause state.

At the time of occurrence of a communication disconnection in SEQ 603, the system controller 50 displays the messages 300 and 301 indicating suspension of the print processing and the method of resuming the print processing, as exemplified in FIG. 12, on the image display unit 28 of the digital camera 100. Also, the system controller 50 displays the message 302 to prompt the user to cancel the suspended print processing, and displays the cancel button 303 in correspondence with the message 302.

When the printer 200 is paused in SEQ 604, it may notify the user of the paused state using LED indicators, a LCD display, or an audible message on the display unit 203 so as to request to acquire the next image data to be printed.

In order to resume the print processing (SEQ 601) suspended due to the communication disconnection in SEQ 603, the user moves the digital camera 100 closer to the printer 200 again when the printer 200 is paused in SEQ 604. At this time, the user does not designate to cancel the print processing on the digital camera 100. That is, the user need not do any operation on the operation unit 70 of the digital camera 100.

When the user moves the digital camera 100 closer to the printer 200, a communication between the digital camera 100 and printer 200 is established again (SEQ 605). Then, the digital camera 100 transmits a DPS_ConfigurePrintService script to the printer 200 (SEQ 606). Upon reception of this DPS_ConfigurePrintService script, the printer 200 returns a response with respect to this received script to the digital camera 100 using a response script. As described above, the digital camera 100 determines based on parameters included in the response script from the printer 200 if the connected printer 200 is the same as that connected upon establishing a previous communication.

As a result of comparison of the parameters, if it is determined that the currently connected printer is different from that connected upon establishing a previous communication, the system controller 50 of the digital camera 100 displays a message indicating that print processing cannot be continued on the image display unit 28. Likewise, the system controller 207 of the printer 200 displays a message indicating that print processing cannot be continued on the display unit 203.

On the other hand, as a result of comparison of the parameters, if it is determined that the currently connected printer is the same as that connected upon establishing a previous communication, the digital camera 100 transmits a DPS_GetDeviceStatus script to the printer 200 so as to grasp the status of the printer 200 (SEQ 607). In response to the DPS_GetDeviceStatus script, the printer 200 transmits a response script indicating the pause state to the digital camera 100 (SEQ 608).

Upon reception of the response script transmitted from the printer 200 in SEQ 608, the digital camera 100 transmits a DPS_ContinueJob script as a resume request of the suspended print processing to the printer 200 (SEQ 609). Upon reception of this print resume request, the printer 200 starts print processing from the second image data in the sequence of SEQ 610 and the subsequent sequences since the print processing of image data for one out of 10 paper sheets designated by the print request in SEQ 601 is complete.

Note that the sequence of SEQ 610 and the subsequent sequences are the same as those of SEQ 406 to SEQ 413 described using FIG. 5. That is, in response to the print resume request in SEQ 609, the printer 200 transmits a DPS_GetFileInfo script to the digital camera 100 to request it to send file information of print-designated image data (SEQ 610). The printer 200 determines based on the file information transmitted from the digital camera 100 (SEQ 611) in response to the DPS_GetFileInfo script if that file can be processed. If it is determined that the file can be processed, the printer 200 transmits a DPS_GetFile script to the digital camera 100 to request it to send that file (SEQ 612).

The printer 200 receives image data transmitted from the digital camera 100 (SEQ 613) in response to the request in SEQ 612. The printer 200 transmits a DPS_NotifyDeviceStatus script indicating that the print processing is in progress (Printing) to the digital camera 100 (SEQ 614). Also, the printer 200 transmits a DPS_NotifyJobStatus script which notifies the digital camera 100 of progress information of printing to the digital camera 100 (SEQ 615). Then, the printer 200 starts print processing (SEQ 616).

Upon completion of printing of image data for one paper sheet, the sequence returns to SEQ 610. Then, file information of next image data to be printed is acquired, and a file of image data indicated by that file information is transmitted from the digital camera 100 to the printer 200.

The sequences of SEQ 610 to SEQ 616 are repeated until the print processing of images as many as the number of paper sheets designated by the print request in SEQ 601 is completed. A value, which is indicated by a tag progress in the DPS_NotifyJobStatus script used to notify the digital camera 100 of the print progress information, and indicates the number of order of the paper sheet, the print processing of which is currently in progress, changes every time the print processing progresses. On the other hand, the DPS_NotifyDeviceStatus script which indicates that the print processing is in progress in SEQ 614 is transmitted only at the time of the first print processing since re-establishment of a communication in SEQ 605.

Upon completion of printing of all image data designated by the print request, the printer 200 notifies the digital camera 100 that it is in an idle state using a DPS_NotifyDeviceStatus script (SEQ 617), thus ending the series of print processes.

<Cancel Suspended Print Processing and Start New Print Processing>

Figure 14:
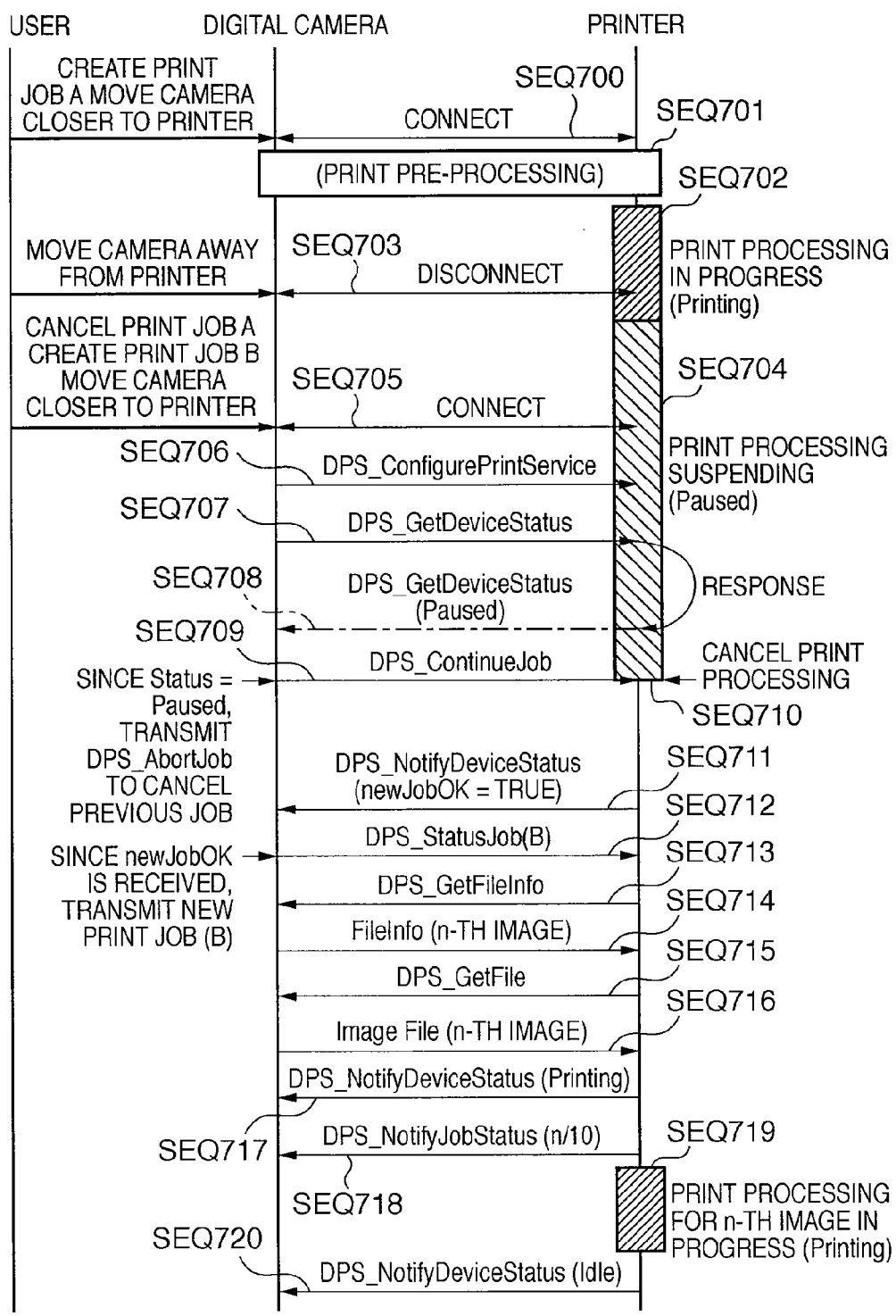
FIG. 14 is a sequence chart showing the sequence of an example in which suspended print processing is canceled, and new print processing is started according to the embodiment of the present invention.

An example of (3) "to cancel the suspended print processing and to start new print processing" will be described below. FIG. 14 shows the sequence of an example when the suspended print processing is canceled, and new print processing is started. A case will be exemplified below wherein the digital camera 100 designates a print request of image data for 10 paper sheets to the printer 200.

The sequences of SEQ 700 and SEQ 701 are the same as those of SEQ 500 and SEQ 501 in FIG. 11 above. That is, when the user creates print job A, and moves the digital camera 100 closer to the printer 200, a close proximity wireless communication between the digital camera 100 and printer 200 is established (SEQ 700). In SEQ 701, the printer 200 executes print pre-processing by the aforementioned processes in SEQ 401 to SEQ 411 described using FIG. 5, and starts print processing.

During the print processing (SEQ 702), when the digital camera 100 falls outside the communicable range of the printer 200, the close proximity wireless communication is disconnected (SEQ 703). The printer 200 suspends the print processing after completion of printing of currently printed image data for, for example, one paper sheet (SEQ 704), and is set in a pause state.

At the time of occurrence of a communication disconnection in SEQ 703, the system controller 50 displays the messages 300 and 301 indicating suspension of the print processing and the method of resuming the print processing, as exemplified in FIG. 12, on the image display unit 28 of the digital camera 100. Also, the system controller 50 displays the message 302 to prompt the user to cancel the suspended print processing, and displays the cancel button 303 in correspondence with the message 302.

In this state, the user designates the cancel button 303 by operating the operation unit 70 of the camera to cancel print job A on the digital camera 100 side. Furthermore, the user creates new print job B from a menu screen (not shown) displayed after print job A is canceled. After that, when the user moves the digital camera 100 closer to the printer 200, a close proximity wireless communication between the digital camera 100 and printer 200 is established (SEQ 705).

After the communication is established again between the digital camera 100 and printer 200 in SEQ 705, the digital camera 100 transmits a DPS_ConfigurePrintService script to the printer 200 (SEQ 706). As in SEQ 506 in FIG. 11, the digital camera 100 determines based on a response script with respect to the script transmitted in SEQ 706 if the connected printer 200 is the same printer 200 connected upon establishing a previous communication (SEQ 701).

If it is determined that the currently connected printer is different from that connected upon establishing a previous communication, a message indicating that print processing cannot be continued is displayed on the image display unit 28 of the digital camera 100 and the display unit 203 of the printer 200.

On the other hand, if it is determined that the currently connected printer is the same as that connected upon establishing a previous communication, the digital camera 100 transmits a DPS_GetDeviceStatus script to the printer 200 so as to grasp the status of the printer 200 (SEQ 707). In response to the DPS_GetDeviceStatus script, the printer 200 transmits a response script indicating the pause state to the digital camera 100 (SEQ 708). In response to this response script, the digital camera 100 transmits a DPS_AbortJob script as a print processing abort request to the printer 200 so as to abort the suspended print processing (SEQ 709). Upon reception of this DPS_AbortJob script, the printer 200 aborts the print processing based on print job A, which was suspended before a communication disconnection in SEQ 703 (SEQ 710).

Note that a tag abortStyle in the DPS_AbortJob script allows the digital camera 100 to designate the type of print abort processing of the printer 200. More specifically, the digital camera 100 can designate whether print processing is immediately aborted even during printing or it is aborted after currently printed image data is printed on one paper sheet.

After the printer 200 executes print abort processing in response to the print abort request in SEQ 709, it sets a value of a tag newJobOK in a DPS_NotifyDeviceStatus script to be "TRUE" indicating a printable state. The printer 200 transmits this DPS_NotifyDeviceStatus script to the digital camera 100 (SEQ 711). Consequently, the printer 200 notifies the digital camera 100 that new print processing is acceptable. In response to this DPS_NotifyDeviceStatus script, the digital camera 100 transmits a DPS_StartJob script indicating new print job B to the printer 200 (SEQ 712).

Note that the sequence of SEQ 712 and the subsequent sequences are the same as those of SEQ 406 to SEQ 413 described using FIG. 5. That is, in response to the print start request of print job B in SEQ 712, the printer 200 transmits a DPS_GetFileInfo script to the digital camera 100 to request it to send file information of print-designated image data (SEQ 713). The printer 200 determines based on the file information transmitted from the digital camera 100 in response to the DPS_GetFileInfo script (SEQ 714) if that file can be processed. If it is determined that the file can be processed, the printer 200 transmits a DPS_GetFile script to the digital camera 100 to request it to send that file (SEQ 715).

The printer 200 receives image data transmitted from the digital camera 100 (SEQ 716) in response to the request in SEQ 715. The printer 200 transmits a DPS_NotifyDeviceStatus script indicating that the print processing is in progress to the digital camera 100 (SEQ 717). Also, the printer 200 transmits a DPS_NotifyJobStatus script which notifies the digital camera 100 of progress information of printing to the digital camera 100 (SEQ 718). Then, the printer 200 starts print processing (SEQ 719).

Upon completion of printing of image data for one paper sheet, the sequence returns to SEQ 713. Then, file information of next image data to be printed is acquired, and a file of image data indicated by that file information is transmitted from the digital camera 100 to the printer 200.

The sequences of SEQ 713 to SEQ 719 are repeated until the print processing of images as many as the number of paper sheets designated by the print request in SEQ 713 is completed. A value, which is indicated by a tag progress in the DPS_NotifyJobStatus script used to notify the digital camera 100 of the print progress information, and indicates the number of order of the paper sheet, the print processing of which is currently in progress, changes every time the print processing progresses. On the other hand, the DPS_NotifyDeviceStatus script which indicates that the print processing is in progress in SEQ 717 is transmitted only at the time of the first print processing since re-establishment of a communication in SEQ 705.

Upon completion of printing of all image data designated by the print request, the printer 200 notifies the digital camera 100 that it is in an idle state using a DPS_NotifyDeviceStatus script (SEQ 720), thus ending the series of print processes.

As described above, according to the embodiment of the present invention, when direct print processing is executed between the image input apparatus and image output apparatus using the close proximity wireless communication, the output processing can be suspended and resumed or new output processing can be started without requiring the user to make complicated operations.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2008-171238, filed Jun. 30, 2008 which is hereby incorporated by reference herein in its entirety.

What is claimed is:

1. An image output system which connects an image input apparatus and an image output apparatus by a close proximity wireless communication, and outputs image data, which is transmitted from the image input apparatus by the close proximity wireless communication, by the image output apparatus, the image input apparatus comprising:
a first communication unit configured to perform the close proximity wireless communication;

a first detection unit configured to detect whether state of the close proximity wireless communication is connected or disconnected;

an operation unit configured to accept a user operation that designates output processing to be executed by the image output apparatus;

an information generation unit configured to generate output information used to indicate the output processing in accordance with at least the user operation accepted by the operation unit; and a first control unit configured to control the first communication unit to transmit the output information generated by the information generation unit to the image output apparatus when the first detection unit detects the disconnection after the first communication unit transmits image data, and the first detection unit detects the connection again after detection of the disconnection, and the image output apparatus comprising:

a second communication unit configured to perform the close proximity wireless communication;

a second detection unit configured to detect whether state of the close proximity wireless communication is connected or disconnected;

an image output unit configured to output image data; and a second control unit configured to suspend output processing of the image data by the image output unit when the second detection unit detects the disconnection during the output processing of the image data, which is received by the second communication unit, by the image output unit, and to control the output processing of the image data by the image output unit in accordance with the output information received from the image input apparatus by the second communication unit when the second detection unit detects the connection again.

2. The apparatus according to claim 1, wherein the output information includes a tag for defining the output processing.

3. An image input apparatus for transmitting image data to an image output apparatus connected by a close proximity wireless communication, comprising:

a communication unit configured to perform the close proximity wireless communication;

a detection unit configured to detect whether a state of the close proximity wireless communication is connected or disconnected;

an operation unit configured to accept a user operation that designates output processing to be executed by the image output apparatus;

an information generation unit configured to generate output information used to indicate the output processing in accordance with at least the user operation accepted by the operation unit; and a control unit configured to control the communication unit to transmit the output information generated by the information generation unit to the image output apparatus when the detection unit detects the disconnection after the communication unit transmits image data, and the detection unit detects the connection again after detection of the disconnection.

4. The apparatus according to claim 3, wherein the control unit controls the information generation unit to generate the output information, which defines at least one of canceling of the output processing, resuming of the output processing, and canceling of the output processing and starting of output processing of new image data, in accordance with the user operation associated with the output processing of the image data suspended by the image output apparatus.

5. The apparatus according to claim 4, wherein when the operation unit does not accept any user operation from when the detection unit detects the disconnection until the detection unit detects the connection again, the information generation unit generates the output information which defines resuming of the output processing.

6. The apparatus according to claim 3, further comprising a display unit configured to display a message for a user, wherein when the detection unit detects the disconnection, the control unit controls the display unit to display the message at least indicating that the close proximity wireless communication is disconnected.

7. The apparatus according to claim 6, wherein when the detection unit detects the disconnection, the control unit controls the display unit to further display the message indicating output processing that can be designated for the image output apparatus when the close proximity wireless communication between the image input apparatus and the image output apparatus is connected again.

8. The apparatus according to claim 7, wherein the message indicating the output processing that can be designated is a message indicating that the suspended output processing of image data is resumed by an operation for re-connecting the image input apparatus and the image output apparatus.

9. The apparatus according to claim 3, wherein the output information includes a tag for defining the output processing.

10. A method of controlling an image input apparatus for transmitting image data to an image output apparatus connected by a close proximity wireless communication, the method comprising following steps of:

accepting a user operation that designates output processing to be executed by the image output apparatus;

generating output information used to define the output processing in accordance with at least the user operation;

performing the close proximity wireless communication and transmitting image data to the image output apparatus;

detecting whether the close proximity wireless communication is connected or disconnected; and transmitting the generated output information to the image output apparatus when the disconnection of the close proximity wireless communication is detected after the image data is transmitted, and the connection of the close proximity wireless communication is detected again after the disconnection of the close proximity wireless communication is detected.

11. An image output apparatus for outputting image data transmitted from an image input apparatus connected by a close proximity wireless communication, comprising:

a communication unit configured to perform the close proximity wireless communication;

a detection unit configured to detect whether state of the close proximity wireless communication is connected or disconnected;

an image output unit configured to output image data received from the image input apparatus by the communication unit; and a control unit configured to suspend output processing of the image data by the image output unit when the detection unit detects the disconnection during the output processing of the image data by the image output unit, and to control the output processing of the image data by the image output unit in accordance with output information which is received from the image input apparatus by the communication unit and is used to define output processing to be executed by the image output apparatus when the detection unit detects the connection again.

12. A method of controlling an image output apparatus for outputting image data transmitted from an image input apparatus connected by a close proximity wireless communication, the method comprising the following steps of:
receiving image data from the image input apparatus;
outputting the received image data;
detecting whether the close proximity wireless communication is connected or disconnected;
suspending output processing of the image data, when the disconnection of the close proximity wireless communication is detected during the output processing of the image data image data; and
when the connection of the close proximity wireless communication is detected again after the disconnection, controlling the output processing of image data in accordance with output information which is received from the image input apparatus and which is used to define the output processing to be executed by the image output apparatus.

13. A computer program stored in a non-transitory computer readable storage medium which causes a computer to transmit image data to an image output apparatus connected by a close proximity wireless communication, the computer program comprising instructions for:
performing the close proximity wireless communication;
detecting whether a state of the close proximity wireless communication is connected or disconnected;
accepting a user operation that designates output processing to be executed by the image output apparatus;
generating output information used to define the output processing in accordance with at least the accepted user operation; and
transmitting the generated output information to the image output apparatus when the disconnection of the close proximity wireless communication is detected after the image data is transmitted, and the connection of the close proximity wireless communication is detected again after detection of the disconnection.

14. A computer program stored in a non-transitory computer readable storage medium which causes a computer to output image data transmitted from an image input apparatus connected by a close proximity wireless communication, the computer program comprising instructions for:
performing the close proximity wireless communication;
detecting whether state of the close proximity wireless communication is connected or disconnected;
outputting image data received from the image input apparatus; and
suspending output processing of the image data when the disconnection of the close proximity wireless communication is detected during the output processing of the image data, and controlling the output processing of the image data in accordance with output information which is received from the image input apparatus and is used to define output processing to be executed by the image output apparatus when the connection of the close proximity wireless communication is detected again.

15. The apparatus according to claim 3, further comprising an image capturing unit for capturing an image of an object,
wherein the control unit controls the communication unit to transmit the image data of the image captured by the image capturing unit.

16. The apparatus according to claim 3, wherein the image input apparatus functions as a digital camera.

17. The apparatus according to claim 3, wherein the close proximity wireless communication starts when the image input apparatus becomes within a predetermined distance of the image output apparatus.

18. The apparatus according to claim 3, wherein the close proximity wireless communication interrupts when the image input apparatus becomes separated from the image output apparatus by more than a predetermined distance.

19. The apparatus according to claim 3, wherein the image output apparatus functions as a printer.

\* \* \* \* \*